United States Patent Office 3,541,120
Patented Nov. 17, 1970

3,541,120
METHOD FOR PREPARING PERFLUOROACYL ISOCYANATES
William Charles Firth, Jr., Wilton, Conn., assignor to American Cyanamid Company, Stamford, Conn., a corporation of Maine
No Drawing. Filed June 1, 1967, Ser. No. 642,714
Int. Cl. C07c *53/28;* D06m *13/20*
U.S. Cl. 260—404       5 Claims

ABSTRACT OF THE DISCLOSURE

A class of perfluorinated acyl isocyanates having the formula

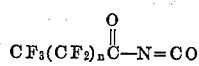

where $n$ is an integer of from 0 to 16, are prepared by (1) condensing together in a cooled reaction zone (a) from about one-half mole to about 3 mole proportions of isocyanic acid and (b) about 1 mole proportion of a perfluorinated carboxylic acid anhydride of the formula

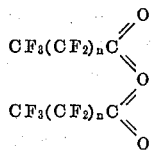

where $n$ has the same meaning as above, (2) removing the cooling means whereby the reaction zone is exposed to room temperature, (3) permitting the reaction zone to stand at room temperature for from about one-half to about five hours and (4) recovering the perfluoroacyl isocyanate product from the reaction zone. The new compounds are useful as textile treating agents.

---

This invention relates to and has for its object the provision of a new class of compounds, viz., perfluorinated acyl isocyanates of the formula

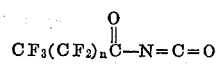

where $n$ represents an integer of from zero to about 16. Due to their high fluorine contents these compounds are useful as textile treating agents, imparting excellent oil- and water-resistance to fabrics treated therewith.

In accordance with the invention, it has now been found that the perfluoroacyl isocyanates may be prepared by the reaction of the corresponding perfluorinated carboxylic acid anhydride with isocyanic acid under mild conditions. More specifically, it has been found that by condensing the anhydride and the isocyanic acid together in a cooled reaction zone and then removing the cooling means, whereby the reaction zone is permitted to warm to room temperature, reaction takes place to form substantial amounts of the perfluoroacyl isocyanates within a relatively short period of time, i.e., as little as one-half hour.

Preferably, the reaction time should be from about 1 to about 2 hours, although times up to about 5 hours are generally suitable. Thus, it has been found that with longer reaction times, formation of other products, such as perfluorodiacylamide, takes place to the detriment of the perfluoroacyl isocyanate product.

While the precise mechanism of the reaction has not been delineated, it has been found that from about one-half mole to about 3 moles of isocyanic acid per mole of perfluoroacyl anhydride may be used in the reaction, an excess of isocyanic acid, i.e., above a 1:1 mole ratio thereof to the anhydride being preferred.

Without, therefore, intending to limit the invention by theoretical considerations, it is considered that the following reaction sequence, taking trifluoroacetic anhydride as typical, may be involved.

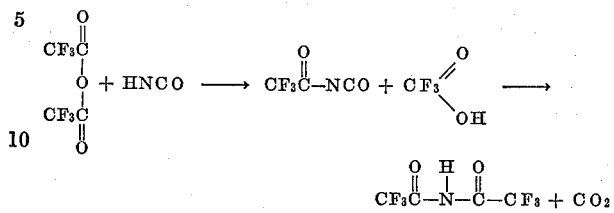

Thus, the isocyanate product is formed first, while the diacetamide forms on prolonging the reaction time. Accordingly, by restricting the reaction time as above-indicated, and using an excess of the isocyanic acid, i.e., above a 1:1 mole ratio thereof to the anhydride, the formation of the isocyanate is enhanced.

The following preparational examples will serve to illustrate the invention.

EXAMPLE 1

Preparation of trifluoroacetyl isocyanate 0.48 gram (2.3 mmoles) of gaseous trifluoroacetic anhydride and 0.19 gram (4.5 mmole) of gaseous isocyanic acid were condensed into a dry, 30-ml. reactor which was cooled by a bath of liquid nitrogen to $-196°$ C. The bath was then removed. An exothermic reaction took place as the reaction mixture warmed to room temperature. After one hour of reaction, fractionation in a vacuum line gave three volatile fractions, viz., (1) 0.11 g. (2.4 mmoles) of $CO_2$ which passed through a $-132°$ C. trap, (2) 0.12 g. (0.85 mmole) of a gas identified as trifluoroacetyl isocyanate (see below) which passed through a $-23°$ C. trap and was retained by a $-132°$ C. trap and (3) a solid, not identified, which was retained in the $-23°$ C. trap. The reactor contained additional solid.

Gaseous fraction "(2)" was identified as trifluoroacetyl isocyanate by (a) its infrared spectrum, which showed the characteristic isocyanate absorption at $4,4\mu$ and a carbonyl absorption at $5.6\mu$ and (b) by its molecular weight (gas density) of 142 (calculated=139). The weight of the fraction, corresponds to a yield of 37% of theoretical, based on the trifluoroacetic anhydride reactant.

EXAMPLE 2

Pentafluoropropionyl isocyanate 0.62 g. (2.0 mmoles) of gaseous pentafluoropropionic anhydride and 0.18 g. (4.1 mmoles) of isocyanic acid were condensed into a dry 30 ml. reactor, which was cooled by a liquid nitrogen bath. The bath was removed, and after 65 minutes the volatile product was fractionated in a vacuum line. One fraction passed through a $-23°$ C. trap and was retained by a trap at $-132°$ C. An infrared spectrum on this fraction showed strong isocyanate absorptions at 4.4, 4.5 and $7.0\mu$ and a carbonyl absorption at $5.6\mu$. These strong bands were at essentially the same positions as the isocyanate and carbonyl absorptions of trifluoroacetyl isocyanate (Example 1) and perfluorooctanoyl isocyanate (Example 3 below) and thus show the presence of substantial amounts of pentafluoropropionyl isocyanate. The spectrum also indicated the presence of some pentafluoropropionic acid and pentafluoropropionic anhydride.

EXAMPLE 3

Perfluorooctanoyl isocyanate

Perfluorooctanoic anhydride was analyzed by infrared spectroscopy and found to show the expected absorptions for an anhydride group and additional absorption which indicated the presence of some perfluorooctanoic acid as an impurity. A dry, approximately 30-ml. bulb was charged with 0.86 g. of this material (approximately 1.0 mmole of anhydride). The reactor was cooled to −196° C. in a nitrogen bath and evacuated. 1.2 g. of gaseous ethyl ether (16 mmoles) and then .095 g. of gaseous isocyanic acid (2.2 mmoles) were added by vacuum transfers to the cooled reactor. The bath was removed, and the reactor was allowed to warm spontaneously to room temperature. Meanwhile the reactor was gently shaken until the reaction mixture became a homogeneous solution. The reaction was allowed to proceed for 1.5 hours after the cold bath was removed. The reaction product was then fractionated in a vacuum line by means of a trap at −23° C. After the most volatile fraction had volatized out of the reactor, gentle heat was applied to the reactor and to the tube connecting the reactor and trap. The ethyl ether passed through the −23° C. trap, and a residue remained in the reactor. The main infrared absorptions of the product (0.42 g.) which collected in the trap corresponded to those of a sample of pure perfluorooctanoyl isocyanate prepared by an alternate route (Example 3A below). In particular, isocyanate absorptions at 4.4, 4.5 and 7.0μ and the carbonyl absorption at 5.6μ are characteristic of this and the other perfluoroacyl isocyanates of this invention. The infrared spectrum also indicated the presence of perfluorooctanoic acid and perfluorooctanoic anhydride as impurities.

EXAMPLE 3A

The synthesis of perfluorooctanoyl isocyanate by reaction of perfluorooctanoyl chloride with silver cyanate 1.9 g. (4.4 mmoles) of perfluorooctanoyl chloride and 1.4 g. (9.2 mmoles) of silver cyanate were heated in a 4-ml. reactor for 7 days at 101–105° C. The product was cooled to room temperature and the material which was volatile at room temperature was pumped into an evacuated trap. This fraction, after vacuum transfer to a tared bulb, weighed 0.22 g. (0.5 mmole) and was a colorless liquid. An infrared spectrum indicated that the liquid was pure perfluorooctanoyl isocyanate. Strong isocyanate absorption at 4.4, 4.5 and 7.0μ and a carbonyl absorption at 5.6μ were observed.

A sample of the liquid rapidly solidified when exposed to air. The isocyanate also reacted rapidly with benzyl alcohol to form a solid derivative, M.P. 118–119° C. (after recrystallization from benzene). Analysis showed that this material was the expected 1:1 adduct.

*Analysis.*—Calcd. for $C_{16}H_8F_{15}NO_3$ (percent): C, 35.11; H, 1.47. Found (percent): C, 34.82; H, 1.78.

Similarly, in accordance with this invention, higher perfluoroacyl anhydrides, such as perfluorodocecanoic anhydride, perfluorotetradecaonic anhydride, perfluorohexadecanoic anhydride and perfluorooctadecanoic anhydride, may be reacted with isocyanic acid to form perfluorododecanoyl isocyanate, perfluorotetradecanoyl isocyanate, perfluorohexadecanoyl isocyanate, respectively.

I claim:
1. A method for preparing a perfluoroacyl isocyanate of the formula

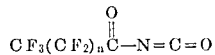

where $n$ is an integer from zero to 16 which comprises (1) condensing together in a cooled reaction zone from about one-half to about 3 mole proportions of isocyanic acid and about one mole proportion of a perfluorinated carboxylic acid anhydride of the formula

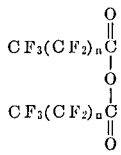

where $n$ has the same meaning as above, (2) removing the cooling means so that the reaction zone is exposed to room temperature, (3) allowing the reaction zone to stand at room temperature for a period of from about one-half hour to about 5 hours and (4) recovering the perfluoroacyl isocyanate product from the reaction zone.

2. The method of claim 1 wherein the mole proportion of isocyanic acid to perfluorinated carboxylic acid anhydride is above 1:1.

3. The method of claim 2 wherein the perfluorinated carboxylic acid anhydride is perfluoroacetic anhydride and the perfluoroacyl isocyanate product is perfluoroacetyl isocyanate.

4. The method of claim 2 wherein the perfluorinated carboxylic acid anhydride is perfluorooctanoic anhydride and the perfluoroacyl isocyanate product is perfluorooctanoyl isocyanate.

5. The method of claim 2 wherein the perfluorinated carboxylic acid anhydride is perfluorooctadecanoic anhydride and the perfluoroacyl isocyanate product is perfluorooctadecanoyl isocyanate.

References Cited

UNITED STATES PATENTS

| 2,593,737 | 4/1952 | Diesslin et al. | 260—514 |
| 2,617,817 | 11/1952 | Ahlbrecht et al. | 260—453 |
| 2,706,733 | 4/1955 | Reid | 260—453 |

OTHER REFERENCES

Young et al.: J. Am. Chem. Soc., vol. 84, pp. 2105–09. (1962).

Speziale et al.: J. Arg. Chem., vol. 27, pp. 3742–3, (1962).

CHARLES B. PARKER, Primary Examiner

D. H. TORRENCE, Assistant Examiner

U.S. Cl. X.R.

8—115.6; 117—139.5; 252—8.6; 260—408, 413, 539, 545, 546, 561